United States Patent [19]

Fritschi

[11] 4,144,604
[45] Mar. 20, 1979

[54] LATERAL BOTTOMS FOR HEADRESTS, SEAT CUSHIONS OR THE LIKE IN MOTOR VEHICLES

[75] Inventor: Willi Fritschi, Sindelfingen, Fed. Rep. of Germany

[73] Assignee: Daimler-Benz Aktiengesellschaft, Fed. Rep. of Germany

[21] Appl. No.: 859,594

[22] Filed: Dec. 12, 1977

[30] Foreign Application Priority Data

Dec. 14, 1976 [DE] Fed. Rep. of Germany ....... 2656480

[51] Int. Cl.$^2$ ............................................. A47C 7/38
[52] U.S. Cl. ........................................ 5/360; 5/337; 297/391
[58] Field of Search ................... 297/391, 397; 5/337, 5/353 H, 355, 361 B, 351

[56] References Cited

U.S. PATENT DOCUMENTS

| 2,659,421 | 11/1953 | Wass et al. | 5/360 |
| 3,323,152 | 6/1967 | Lerman | 5/355 |
| 3,508,788 | 4/1970 | Barton, Jr. et al. | 297/391 |
| 3,665,530 | 5/1972 | Bosner | 5/360 |

Primary Examiner—Casmir A. Nunberg
Attorney, Agent, or Firm—Craig & Antonelli

[57] ABSTRACT

Lateral bottoms for headrests, for seat cushions in motor vehicles or the like, in which the lateral bottoms consist of textile material or plastic material and are enclosed on the outside by a cording; the cording itself is made as an endless plastic injection-molded ring provided along the outside with weldable tabs or flaps which are welded together with the bottom with the aid of a correspondingly constructed high-frequency welding machine.

4 Claims, 1 Drawing Figure

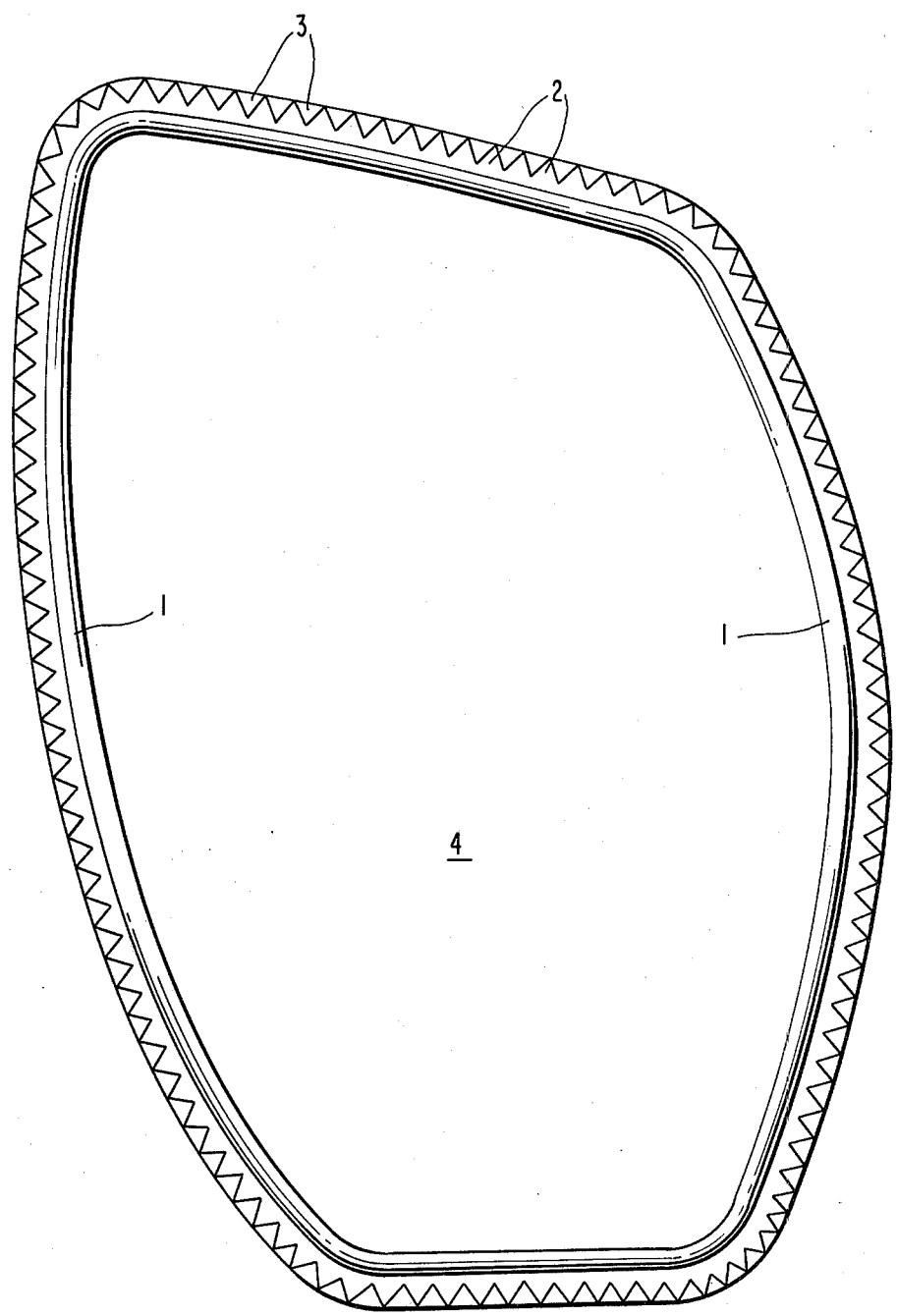

LATERAL BOTTOMS FOR HEADRESTS, SEAT CUSHIONS OR THE LIKE IN MOTOR VEHICLES

The present invention relates to lateral bottoms or side parts for headrests, for seat cushions in motor vehicles or the like whereby the bottoms or side parts consist of synthetic leather (plastic material) or textile (fabric) material and are enclosed on the outside by a cording.

The lateral bottoms or side parts of headrests have been enclosed heretofore with a cording which was supplied as endless strip. This plastic cording strip was provided laterally with a flap for the sewing-on operation. The flap was so sewed together with the bottom that the flap came to lie on the outside and the cording bead on the inside and the edge of the flap was placed with equal overlap on the edge of the cover material.

For purposes of sewing together, the material had to be prepared in such a manner that two cuts had to be made along one lateral edge of the bottom to such a depth as corresponded to the width of the plastic cording strip together with the width of the flap. During the beginning of the sewing operation, a starting piece of the cording strip was placed with the edge of its flap in overlapping relationship on the edge of the material in such a manner that the tongue which resulted from the cut in the material was folded over an end section of the cording strip and then the tongue was sewed together with the flap. The starting section of the cording strip covered by the tongue of the material was approximately half as long as the width of the tongue which resulted from the two cuts in the material.

During the further sewing operation, the seamstress had to pay very careful attention that the edge of the flap of the cording always overlapped with the edge of the material disposed therebelow. This required particular care, attention and skill, especially with arcs which the cording strip had to assume in the course of the sewing operation. Along particularly strongly curved arcs it was additionally necessary to cut into the flap once or several times in order that the cording strip could adapt itself at all to this sharp bend. During the sewing-on operation of the end section of the cording strip, particular care had to be used again since now the rest of the tongue of the material also had to be placed again about the end of the cording strip and then the tongue had to be sewed together with the flap of the cording in the last section.

Already from this description which of necessity takes at least as long to read as the duration of the sewing operation itself, it follows that the described, heretofore used sewing method was not only time-consuming but also required a capable seamstress with great skill.

It is the aim of the present invention to simplify this method and to make it less time-consuming so that not only time is gained but also the work can be carried out in a simple manner by unskilled or less skilled help.

The underlying problems are solved according to the present invention in that the cording is injection molded as endless synthetic resinous material ring which is provided at the outside of its periphery with weldable tabs which are welded together with the covering with the aid of a correspondingly constructed high-frequency welding machine.

A cording ring constructed in this manner can be manufactured in large numbers in a very short period of time with complete uniformity. For connecting the cording ring with the bottom, the cording ring is inserted into a form or mold matched thereto with its inside facing upwardly and the bottom is then placed into the same form or mold. The form or mold which represents simultaneously the welding electrode is then laterally introduced into a welding machine and the parts to be welded together are pressed together by means of a press and simultaneously the high frequency part is turned on.

In fractions of a second, the welding operation is completed. The matrix or mold with the welded together parts can now be removed out of the machine and the finished part can now be removed from the form or mold. For larger quantity needs, two or several cording rings can be simultaneously welded together with several plastic or fabric bottoms if the welding machine is correspondingly constructed and equipped. Any desired quantity of welded bottoms can be manufactured in this manner per time unit.

Accordingly, it is an object of the present invention to provide lateral bottoms for headrests, seat cushions or the like in motor vehicles which avoid by simple means the aforementioned shortcomings and drawbacks encountered in the prior art.

Another object of the present invention resides in the provision of lateral bottoms or side parts for headrests, seat cushions or the like in motor vehicles which can be manufactured by extremely simple and relatively inexpensive means, obviating the need for skilled labor.

A further object of the present invention resides in lateral bottoms or side parts for headrests, seat cushions or the like of the type described above which can be manufactured in a relatively short period of time, especially by the use of mass production techniques.

Still another object of the present invention resides in a method for manufacturing lateral bottoms for headrests, seat cushions in motor vehicles or the like which greatly simplifies and facilitates the manufacture thereof.

These and other objects, features and advantages of the present invention will become more apparent from the following description when taken in connection with the accompanying drawing which shows, for purposes of illustration only, one embodiment in accordance with the present invention, and wherein:

The single FIGURE is a plan view on a lateral bottom for a headrest which consists of a synthetic plastic cover onto which a cording ring is welded.

Referring now to the single FIGURE of the drawing, the cording ring 1 includes outwardly directed weldable tabs or flaps 2 by means of which it is welded to the edge 3 of the cover 4 of synthetic leather-like or plastic material.

Two completely welded together bottoms are each with the material for the headrest sewed together along the cording. The backrest of the seat can also be manufactured in a similar manner.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim

1. A side part for headrests, for seat cushions in motor vehicles or the like, the side part consists of a plastic or textile material and is joined along outer edges with a cording, characterized in that the cording is constructed as an endless ring of an injection molded plastic material, and in that the cording is provided along an outside thereof with tabs of a weldable material which are welded together with the side part.

2. A side part according to claim 1, characterized in that the weldable tabs are welded together with the side parts with the aid of a high frequency welding machine.

3. A method for manufacturing side parts of headrests, seat cushions and the like of motor vehicles, in which the side parts forming a lateral bottom are made of plastic or textile material and are enclosed on an outside thereof by a cording, comprising the steps of injection molding the cording as an endless part provided along an outside with weldable tabs, and welding the tabs to the edge portion of a corresponding side part.

4. A method according to claim 3, in which the cording with its tabs is placed into a corresponding form so that and inside of the cording faces up and thereafter placing the side part over the cording for welding the edge portion thereof onto the tabs.

* * * * *